United States Patent
Li et al.

(10) Patent No.: US 10,918,992 B2
(45) Date of Patent: Feb. 16, 2021

(54) SYSTEM AND METHOD FOR DESULFURIZATION AND DEDUSTING OF FLUE GAS FROM COKE OVEN

(71) Applicant: ACRE Coking & Refractory Engineering Consulting Corporation (Dalian), MCC, Liaoning (CN)

(72) Inventors: Chao Li, Dalian (CN); Hua Yin, Dalian (CN); Guangming Sun, Dalian (CN); Zhenyu Liu, Dalian (CN); Yanzhong Huo, Dalian (CN); Gangsen Sun, Dalian (CN); Guofeng Zhao, Dalian (CN)

(73) Assignee: ACRE Coking & Refractory Engineering Consulting Corporation (Dalian), MCC, Liaoning (CN)

( * ) Notice: Subject to any disclaimer, the term of this patent is extended or adjusted under 35 U.S.C. 154(b) by 0 days.

(21) Appl. No.: 16/642,914

(22) PCT Filed: Jan. 10, 2019

(86) PCT No.: PCT/CN2019/071084
§ 371 (c)(1),
(2) Date: Feb. 28, 2020

(87) PCT Pub. No.: WO2020/107666
PCT Pub. Date: Jun. 4, 2020

(65) Prior Publication Data
US 2020/0376430 A1 Dec. 3, 2020

(30) Foreign Application Priority Data
Nov. 26, 2018 (CN) .......................... 201811419123.3

(51) Int. Cl.
*B01D 53/75* (2006.01)
*B01D 53/50* (2006.01)
*B01D 53/83* (2006.01)

(52) U.S. Cl.
CPC ............. *B01D 53/75* (2013.01); *B01D 53/50* (2013.01); *B01D 53/83* (2013.01);
(Continued)

(58) Field of Classification Search
CPC ...... B01D 46/00; B01D 53/504; B01D 53/74; B01D 53/75; B01D 2257/302;
(Continued)

(56) References Cited

U.S. PATENT DOCUMENTS 4,340,207 A * 7/1982 Bruhn et al. .............. F27B 1/22
266/155
2015/0298055 A1* 10/2015 Ushiku .............. B01D 53/8609
423/244.09

FOREIGN PATENT DOCUMENTS

| CN | 105944564 A | * 9/2016 | ............. B01D 53/90 |
| CN | 107983155 A | 5/2018 | |

(Continued)

OTHER PUBLICATIONS

Ministry of Ecology and Environment, The People's Republic of China, Discharge Standard, "Emission standard of pollutants for coking chemical industry" (GB16171-2012), Jun. 27, 2012.

*Primary Examiner* — Timothy C Vanoy
(74) *Attorney, Agent, or Firm* — Berggren LLP (57) ABSTRACT

Provided are system and method thereof for desulfurization and dedusting of flue gas from a coke oven. The system for desulfurization and dedusting of flue gas from a coke oven includes a heat exchanger, a desulfurization reaction unit, a dedusting unit, and a blower; the heat exchanger includes a raw flue gas duct and a clean flue gas duct; the raw flue gas (Continued)

duct, the desulfurization reaction unit, and the dedusting unit are coupled in sequence, a clean flue gas outlet of the dedusting unit communicates with an inlet of the clean flue gas duct, and an outlet of the clean flue gas duct is coupled to the blower. The raw flue gas is heated in the heat exchanger by using temperature difference between clean flue gas and the raw flue gas, and then the raw flue gas is delivered into the desulfurization reaction unit for a desulfurization reaction.

20 Claims, 1 Drawing Sheet

(52) U.S. Cl.
CPC .. *B01D 2251/304* (2013.01); *B01D 2251/606* (2013.01); *B01D 2258/0283* (2013.01)

(58) Field of Classification Search
CPC ... B01D 2258/02; B01J 19/00; B01J 2219/00; B01J 2219/00002; B01J 2219/00051; B01J 2219/00054; B01J 2219/00074; B01J 2219/00103; B01J 2219/0088; C10B 45/00; C10B 51/00; C10B 57/005; C10K 1/003; C10K 1/004; C10K 1/02; F28D 9/0093; F28D 21/0003; F28D 21/001; F28D 2021/0056; F28D 2021/0075; C10G 9/002; C10G 9/005
See application file for complete search history.

(56) References Cited

FOREIGN PATENT DOCUMENTS

| | | | |
|---|---|---|---|
| CN | 108854477 A | * | 11/2018 |
| CN | 109224832 A | | 1/2019 |
| EP | 2505256 A1 | | 10/2012 |

* cited by examiner

SYSTEM AND METHOD FOR DESULFURIZATION AND DEDUSTING OF FLUE GAS FROM COKE OVEN

PRIORITY

This application is a U.S, national application of the international application number PCT/CN2019/071084 filed on Jan. 10, 2019 and claiming priority of Chinese application CN201811419123.3 filed on Nov. 26, 2018 the contents of all of which are incorporated herein by reference.

TECHNICAL FIELD

The present disclosure relates to the technical field of flue gas purification, and in particular to a system and method for desulfurization and dedusting of flue gas from a coke oven.

BACKGROUND ART

It is clearly stipulated in the "Pollutant Emission Standard in the Coking Chemical Industry" (GB16171-2012) (hereinafter simply referred to as the "emission standard") that, from Jan. 1, 2015, the emission concentration of $SO_2$ in flue gas, which is generated while charging a newly-built or old coke oven with coal and pushing coke from the coke oven, shall be limited to 50 mg/Nm³ in general districts and limited to 30 mg/Nm³ in special districts, and is even required to reach an ultralow value of less than 15 mg/Nm³ in some particular districts. In the current coking field, only the stable flue gas from a coke oven in cooperation with advanced desulfurization and dedusting processes can meet the requirements of $SO_2$ and particulate matter emission standards. There is no well-developed and reliable process for purification of $SO_2$ from the low-temperature, intermittent, deducted flue gas generated during coal charging, coke discharging, and dry quenching of coke.

It is found by the actual measurement of flue gas from a coke oven that the emission of flue gas from a coke oven has the following characteristics:

(1) Having the Characteristics of Periodicity and Discontinuity

The coke oven process has the characteristic of periodic operation according to the holes of the oven. Depending on different oven types, the oven is charged with coal for an average time of about 1.5 min/oven, with an interval of 9 to 10 min: coke is discharged for an average time of about 1 min/oven, with an interval of 9 to 10 min; and the coke dry quenching operation is performed for an average time of about 1.5 min/oven, with an interval of 9 to 10 min. During the operations of charging of the coke oven with coal, discharging of coke, and dry quenching of coke, flue gas contains a relatively high concentration of $SO_2$; and when the operation is finished, the concentration of $SO_2$ in the flue gas is reduced and even reaches the air standard, Therefore, the flue gas generated during production in the coke oven has the characteristic of discontinuity.

(2) Having the Characteristic of Low Temperature

The flue gas may have a temperature of 40° C. to 100° C. during the operation of charging the coke oven with coal or discharging of coke from the coke oven, and the temperature of the flue gas is reduced to room temperature when the charging of coal or discharging of coke is finished.

(3) The $SO_2$ Concentration Increases at Fast Speed and has a High Peak Value

When the action of charging the coke oven with coal is started, a dedusting blower is activated to run at high speed, and the concentration of $SO_2$ in the flue gas increases rapidly and rises from 10 mg/m³ to 250 mg/m³ in 40 s; during the discharging of coke from the coke oven, the $SO_2$ concentration also increases rapidly and may rise from 10 mg/m³ to 150 mg/m³ in 30 s. This shows that $SO_2$ overflows along with the flue gas mainly in the first half of the coal charging and coke discharging actions, for a relatively short time and with a high instantaneous concentration.

(4) The $SO_2$ Concentration Decreases Slowly

As the coal charging and coke discharging actions are finished, the concentration of $SO_2$ in the flue gas gradually decreases. Since the dedusting blower has been running at low speed, and a large amount of external air is blended upstream of the deduster, the circulatability of the gas stream in the dedusting main duct is weakened, and the $SO_2$ concentration is decreased slowly. It takes about 60 to 120 seconds to decrease from the peak value to the initial value of 10 mg/m³. During the entire cycle, the $SO_2$ concentration is about 80 to 100 mg/m³.

(5) The Flue Gas from a Coke Oven has a Complex Composition

The flue gas from a coke oven contains dust such as coke powder and coal powder, and the dust also contains an explosive component.

(6) The Flue Gas from a Coke Oven has a High Velocity and is Conveyed by a Short Distance In the system for purification of the dedusted flue gas from a coke oven, the flue gas has a flow velocity of about 20 m/s to 24 m/s, which is a fast flow velocity; the combined ducts generally have a conveying distance of about 10 m to 20 m, which is a short conveying distance.

The emission of flue gas from a coke oven is characterized by periodicity, discontinuity, and low temperature, and is characterized in that the $SO_2$ concentration increases at fast speed and has a high peak value; the $SO_2$ concentration decreases slowly; the flue gas from a coke oven has a complex composition, the flue gas from a coke oven has a high velocity and is conveyed by a short distance, etc.

According to the characteristics of flue gas from a coke oven, the development of a more scientific and efficient device and method for dedusting, purification, and desulfurization of flue gas has become the only way for the development of steel and coking enterprises.

In view of this, the present disclosure is particularly proposed.

SUMMARY

An object of the present disclosure includes, for example, providing a system for desulfurization and dedusting of flue gas from a coke oven, which is operated in connection with the characteristics of low temperature and intermittent running of the dedusted flue gas from a coke oven in such a manner that raw flue gas is heated by using a temperature difference between clean flue gas and the raw flue gas and then is subjected to desulfurization reaction treatment, whereby heat from the discharged clean flue gas is effectively utilized, energy is saved, and the problem of high consumption of energy by desulfurization due to low temperature of the flue gas from a coke oven is solved.

Another object of the present disclosure also includes, for example, providing a desulfurization and dedusting method using a system for desulfurization and dedusting of flue gas from a coke oven, which has good desulfurization and dedusting effects, has low energy consumption, and causes less atmospheric pollution.

Embodiments of the present disclosure are implemented as follows:

An embodiment of the present disclosure provides a system for desulfurization and dedusting of flue gas from a coke oven, comprising a heat exchanger, a desulfurization reaction unit, a dedusting unit, and a blower;

wherein the heat exchanger comprises a raw flue gas duct and a clean flue gas duct;

the raw flue gas duct, the desulfurization reaction unit, and the dedusting unit are coupled in sequence, a clean flue gas outlet of the dedusting unit communicates with an inlet of the clean flue gas duct, and an outlet of the clean flue gas duct is coupled to the blower.

It is found by the actual measurement of flue gas from a coke oven that the flue gas from a coke oven has a temperature of 40° C. to 100° C. during an operation of charging the coke oven with coal or discharging the coke from the coke oven, and the temperature of the flue gas is reduced to room temperature when the charging of coal or discharging of coke is finished. The present disclosure is implemented in connection with the characteristic of low temperature of flue gas emissions from a coke oven in such a manner that raw flue gas is heated in the heat exchanger by using a temperature difference between the clean flue gas and the raw flue gas, and then the raw flue gas is delivered into the desulfurization reaction unit for a desulfurization reaction, whereby heat from the discharged clean flue gas is effectively utilized, and energy is saved.

Optionally, the system for desulfurization and dedusting of flue gas from a coke oven described above further comprises a hot air furnace, and an outlet of the hot air furnace is connected to an inlet of a desulfurization reaction duct of the desulfurization reaction unit.

Although most of heat can be transferred from the clean flue gas to the raw flue gas in the heat exchanger such that the temperature of the raw flue gas is increased, the temperatures of the heat exchanger and the desulfurization reaction unit might slowly decrease due to heat loss such as heat dissipation from the system. In the present disclosure, a hot air furnace is used for supplementing heat to the desulfurization reaction unit, thereby compensating for insufficient heat from the clean flue gas during heat exchange, and ensuring continuous and stable running of the system for desulfurization and dedusting of flue gas from a coke oven even in the case where the raw flue gas periodically changes.

Optionally, an inlet of the hot air furnace communicates with the outlet of the clean flue gas duct via the blower, or the inlet of the hot air furnace communicates with the clean flue gas outlet of the dedusting unit via the blower.

In the present disclosure, the dedusted clean flue gas may be introduced by the blower directly into the hot air furnace for heating, and then delivered into the desulfurization reaction duct of the desulfurization reaction unit to increase the temperature of the desulfurization reaction duct. The clean flue gas is heated to supply supplementary heat to the desulfurization reaction duct, so that the residual heat from the clean flue gas can be effectively utilized and the system temperature balance can be maintained in the system for desulfurization and dedusting of flue gas from a coke oven, and energy is saved. In the present disclosure, the clean flue gas which has been subjected to heat exchange and discharged from the clean flue gas duct may also be introduced by the blower into the hot air furnace for heating, and then introduced into the desulfurization reaction duct of the desulfurization reaction unit to increase the temperature in the desulfurization reaction duct. In this way, the residual heat from the clean flue gas can be effectively utilized, energy is saved, and less heat energy is required for heating the low-temperature clean flue gas, and more energy is saved.

In the present disclosure, hot air generated by combusting a fuel such as coal gas may be used in the hot air furnace for heating to supply supplementary heat to the desulfurization reaction duct of the desulfurization reaction unit. For instance, an appropriate amount of coal gas is corn busted by the hot air furnace such that hot air with a certain quantity of heat is generated and mixed with the clean flue gas and then delivered into the desulfurization reaction duct, whereby the temperature of the desulfurization reaction unit is ensured, and stable heat exchange can be performed between the raw flue gas and the clean flue gas.

Optionally, the blower is a frequency-variable blower.

In the present disclosure, a frequency-variable blower is used, and the frequency of the frequency-variable blower may be adjusted based on the concentration of $SO_2$ in the raw flue gas introduced into the system for desulfurization and dedusting of flue gas from a coke oven, so as to adapt to the discontinuity characteristic of the flue gas generated during the production in the coke oven.

Optionally, a raw flue gas system control valve is disposed upstream of an inlet of the raw flue gas duct, and the raw flue gas system control valve is configured to control raw flue gas to be expelled into the atmosphere or enter the raw flue gas duct of the heat exchanger.

The path of the flue gas is controlled based on the content of $SO_2$ in the flue gas from a coke oven. For example, when the flue gas contains a relatively high concentration of $SO_2$, for instance when an operation of charging of the coke oven with coal, discharging of coke from the coke oven, or dry quenching of coke is being performed, the flue gas contains excessive $SO_2$ and dust, thus the system control valve is adjusted to control the raw flue gas to enter the raw flue gas duct of the heat exchanger, and the blower is cooperatively run at full or high load, so that the raw flue gas is subjected to desulfurization and dedusting treatment. When the concentration of $SO_2$ contained in the flue gas meets the emission requirements, for example, when the flue gas contains a continuously decreasing amount of $SO_2$ and dust, meets the emission requirements, and does not need to be desulfurized and dedusted as the operation of charging of the coke oven with coal, discharging of coke from the coke oven, or dry quenching of coke is stopped, the system control valve is adjusted to change the path of the flue gas such that the flue gas is directly delivered and exhausted to the outside, and the blower is cooperatively run at low load, so that the desulfurization and dedusting system can stably treat the flue gas from a coke oven according to the periodic variation of the flue gas. The operating condition is adjusted according to the characteristics of the flue gas from a coke oven, which overcomes the problem that the flue gas from a coke oven cannot be treated stably due to its periodic variation.

Optionally, an outlet of the raw flue gas duct is provided with an air blending valve.

The blower is provided as a frequency-variable blower according to the characteristics of periodicity and discontinuity of flue gas emissions from a coke oven, and the path of the flue gas is controlled based on the content of $SO_2$ in the flue gas from a coke oven. When the concentration of $SO_2$ contained in the flue gas meets the emission requirements; for example, when the flue gas contains a continuously decreasing amount of $SO_2$ and dust, meets the emission requirements, and does not need to be desulfurized and dedusted as the operation of charging of the coke oven with coal, discharging of coke from the coke oven, or dry quenching of coke is stopped, the system control valve is adjusted to change the path of the flue gas such that the flue gas is directly delivered and exhausted to the outside, and the frequency-variable blower is run under a low-load condition to maintain temperature balance in the entire system. At this time; the air blending valve is opened to supplement a certain amount of air to match the low-load-running operating condition of the blower, and air is supplemented while heat in the system is balanced to prevent entry of flue gas at excessively high temperature into the desulfurization and dedusting sections.

Optionally, the desulfurization reaction unit comprises a desulfurizing agent power transmission unit, a desulfurizing agent dosing and feeding unit, and a desulfurization reaction duct;

the desulfurizing agent dosing and feeding unit is configured to adjust an amount of a desulfurizing agent to be fed;

the desulfurizing agent power transmission unit is configured to feed into the desulfurization reaction duct the desulfurizing agent supplied by the desulfurizing agent dosing and feeding unit.

The desulfurizing agent dosing unit calculates and adjusts the amount of the desulfurizing agent to be delivered into the desulfurization reaction duct based on the content of $SO_2$ in the raw flue gas, so that the ratio of sodium to sulfur is 1:(0.8-1.4), thereby improving the desulfurization efficiency.

Optionally, the desulfurizing agent dosing and feeding unit comprises a desulfurizing agent powder silo, a monorail crane is disposed on the top of the desulfurizing agent powder silo; and a frequency-variable discharge valve and a screw weighing and feeding device are disposed on the bottom of the desulfurizing agent powder silo.

The frequency-variable discharge valve may adjust a speed of discharging of the desulfurizing agent based on the concentration of $SO_2$ in the raw flue gas, and the desulfurizing agent is discharged to the screw weighing and feeding device, and transported and delivered into the desulfurization reaction duct. The screw weighing and feeding device is used for weighing the amount of the desulfurizing agent to meet the demand for change in the amount of the material to be used. The frequency-variable discharge valve and the screw weighing and feeding device may adjust, in real time, the amount of the desulfurizing agent to be sprayed based on the concentration of $SO_2$ in the raw flue gas, so that the amount of the desulfurizing agent used is maximally saved while efficient desulfurization is ensured during the entire cycle in the system. The monorail crane is configured to perform an operation of charging the silo with the material.

Optionally, a mill is disposed under the screw weighing and feeding device, and a discharge port of the mill communicates with the desulfurization reaction duct. A single-stage or multi-stage mill may be disposed at the outlet of the screw feeding device to pulverize the desulfurizing agent, in order to allow the desulfurizing agent to be delivered into the desulfurization reaction duct to have a required particle size. For example, when sodium bicarbonate is used as the desulfurizing agent, sodium bicarbonate may be selected to have a particle size of 200 meshes to 800 meshes. If the particle size of sodium bicarbonate is within the above range, it can be ensured that sodium bicarbonate is fully decomposed upon being exposed to flue gas at high temperature to obtain sodium carbonate with a finer particle size, so that sodium carbonate fully reacts with $SO_2$ to further improve the desulfurization efficiency. Depending on the actual particle size of the desulfurizing agent in the silo, the desulfurizing agent is treated with the mill to reach a particle size as required in the desulfurization reaction.

Optionally, a material level gauge, a silo wall vibrator, and an air cannon are disposed inside the desulfurizing agent powder silo.

The material level gauge disposed in the desulfurizing agent powder silo is configured to measure the position of the desulfurizing agent in the desulfurizing agent powder silo so as to provide a real-time understanding of the amount of the desulfurizing agent remaining in the desulfurizing agent powder silo; the silo wall vibrator is configured to prevent and eliminate blockage of the desulfurizing agent powder silo caused by internal friction, deliquescence, electrification, or component segregation of the material or other reasons; the air cannon is operated by using the aerodynamic principle and using air as a working medium, may instantly convert air pressure energy into air jet kinetic energy, which may generate strong airflow to avoid the blockage.

Optionally, multiple mills are provided, the multiple mills are sequentially arranged between an outlet of the screw weighing and feeding device and an inlet of the desulfurization reaction duct, and a particle size of a material obtained after being milled by the mill close to the outlet of the screw weighing and feeding device is larger than a particle size of the material obtained after being milled by the mill remote from the outlet of the screw weighing and feeding device.

Optionally, the desulfurizing agent power transmission unit comprises a compressed air tank and/or a Roots blower.

The desulfurizing agent is delivered into the desulfurization reaction duct by means of the positive pressure of compressed air; or power is supplied by the Roots blower for uniform mixing of the desulfurizing agent and the flue gas.

Optionally, a nozzle is disposed in the desulfurization reaction duct, and the nozzle is connected to an outlet end of the desulfurizing agent power transmission unit.

Optionally, the nozzle is a two-fluid atomizing nozzle. One or more nozzles may be provided according to the actual requirement for mixing uniformity. The nozzle may be disposed at the inlet of the desulfurization reaction duct, or multiple nozzles may be disposed and adjusted in the desulfurization reaction duct as actually needed, and it is preferable to ensure that the desulfurizing agent and the raw flue gas are mixed and resident in the desulfurization section for 1 s to 4 s. The flow velocity of the gas in the desulfurization reaction duct may be adjusted as actually needed, and the length of the desulfurization reaction duct is cooperatively adjusted such that the residence time is 1 s to 4 s, so that the desulfurization reaction is completely carried out. For example, when the gas has a flow velocity of 3 m/s, the desulfurization reaction duct has a length of 3 m to 12 m in order to meet the requirement that the residence time is 1 s to 4 s.

Optionally, the dedusting unit comprises a bag deduster, a conveyor, and a desulfurized ash silo;

an ash outlet of the bag deduster is connected to an inlet end of the conveyor, and an outlet end of the conveyor is connected to an entrance end of the desulfurized ash silo;

a clean flue gas outlet of the bag deduster is connected to the inlet of the clean flue gas duct.

After being dedusted by the bag deduster of the dedusting unit, the filtered desulfurized ash is discharged from the ash outlet to the conveyor, and the conveyor conveys the desulfurized ash to the desulfurized ash silo for collection and storage of the desulfurized ash.

The type of the bag deduster is not limited, but a pulsed bag deduster is preferably used, which has the advantages of strong dust removability, high dedusting efficiency, low emission concentration, low air leakage rate, low energy consumption, etc.

The conveyor may be adjusted according to the actual positions where the bag deduster and the desulfurized ash silo are disposed. For example, when there is a large height difference between the desulfurized ash silo and the ash outlet of the bag deduster, the conveyor may comprise a pneumatic conveyor, a scraper conveyor, a bucket elevator, and the like. The pneumatic conveyor, the scraper conveyor, and the bucket elevator are connected in sequence. The desulfurized ash is discharged from the ash outlet to the pneumatic conveyor and is conveyed to the scraper conveyor by the pneumatic conveyor, and then the scraper conveyor transports the desulfurized ash to the bucket elevator, and the desulfurized ash is lifted and delivered to the desulfurized ash silo by the bucket elevator, whereby the collection and storage of the desulfurized ash are completed.

After the desulfurization reaction is carried out, the product and the unreacted desulfurization reactant enter the bag deduster along with the flue gas to undergo a dedusting treatment. After entering the bag deduster, the unreacted sodium carbonate may continue to react with $SO_2$ in the flue gas such that the duration of the desulfurization reaction is prolonged, the product resulting from the full reaction enters a filtering layer of the deduster together with particulate matters such as dust, and the filtered desulfurized ash is collected. The clean flue gas obtained after the dedusting and desulfurization is delivered into the heat exchanger to exchange heat with the raw flue gas so as to become a clean flue gas at relatively low temperature, which is expelled by the blower into the atmosphere through the chimney or conveyed to the desulfurization reaction unit for heat supplement.

Optionally, the conveyor comprises a pneumatic conveyor, a scraper conveyor, and a bucket elevator, the pneumatic conveyor, the scraper conveyor, and the bucket elevator are connected in sequence, the pneumatic conveyor communicates with the ash outlet, and the bucket elevator communicates with the entrance end of the desulfurized ash silo.

Optionally, the system for desulfurization and dedusting of flue gas from a coke oven further comprises a muffler and a chimney, and the blower, the muffler, and the chimney are coupled in sequence.

Optionally, the system further comprises a raw flue gas conveying pipe and an exhaust duct, wherein both the exhaust duct and the raw flue gas duct communicate with the raw flue gas conveying pipe, the exhaust duct is provided with a first raw flue gas system control valve, and the raw flue gas duct is provided with a second raw flue gas system control valve.

Optionally, a first thermometer is disposed at an inlet of the raw flue gas duct, and a second thermometer is disposed at an outlet of the raw flue gas duct; a third thermometer is disposed at the inlet of the clean flue gas duct, and a fourth thermometer is disposed at the outlet of the clean flue gas duct.

Optionally, the system for desulfurization and dedusting of flue gas from a coke oven further comprises a controller. The controller is electrically connected to each of the valves, and controls the opening, closing and/or opening degree of each valve. For example, the system control valve is electrically connected to the controller, and the system control valve is controlled to be opened or closed according to the operation condition of the coke oven so as to adjust the path of the flue gas.

Optionally, the screw weighing and feeding device is connected to the controller, and the amount of the desulfurizing agent to be fed is adjusted in real time according to the status of the flue gas so as to ensure efficient desulfurization throughout the entire cycle and save the desulfurizing agent.

Optionally, a first thermometer is disposed at the inlet of the raw flue gas duct, and a second thermometer is disposed at the outlet of the raw flue gas duct; a third thermometer is disposed at the inlet of the clean flue gas duct, and a fourth thermometer is disposed at the outlet of the clean flue gas duct.

The controller acquires the temperatures of the respective inlets and outlets of the heat exchanger from the thermometers, and controls, in a coordinated manner, the opening, closing, and/or opening degree of the valves provided at the entrance and outlet of the hot air furnace as well as the opening, closing, and/or opening degree of the air blending valve depending on the temperatures of the respective inlets and outlets of the heat exchanger so as to ensure stable running of the system and maintain temperature balance.

An embodiment of the present disclosure also provides a method for desulfurization and dedusting of flue gas from a coke oven, comprising the steps of:

delivering, by the blower, raw flue gas into the raw flue gas duct for heat exchange, and then allowing the raw flue gas to sequentially enter the desulfurization reaction unit and the dedusting unit for desulfurization reaction and dedusting treatment to obtain clean flue gas, delivering the clean flue gas from the clean flue gas outlet of the dedusting unit into the clean flue gas duct for heat exchange, and then emitting the clean flue gas.

An embodiment of the present disclosure also provides a method for desulfurization and dedusting of flue gas from a coke oven, comprising the steps of:

introducing raw flue gas into the raw flue gas duct by the blower, allowing the raw flue gas to flow from the raw flue gas duct into the desulfurization reaction unit for desulfurization, allowing the desulfurized raw flue gas to enter the dedusting unit for dedusting treatment to obtain clean flue gas, allowing the clean flue gas to flow from the clean flue gas outlet of the dedusting unit into the clean flue gas duct, and allowing the clean flue gas located in the clean flue gas duct and the raw flue gas located in the raw flue gas duct to undergo heat exchange, so as to heat the raw flue gas.

For example, when an operation of charging of a coke oven with coal, discharging of coke from the coke oven, or dry quenching of coke is being performed, raw flue gas is delivered into a heat exchanger to exchange heat with clean flue gas, so that the raw flue gas has an increased temperature and is delivered into a desulfurization reaction unit for desulfurization reaction. If the content of $SO_2$ in the raw flue gas meets the emission standard, the raw flue gas is delivered directly to the outside. Different treatment paths may be used according to different emission requirements.

In the process for desulfurization and dedusting of flue gas from a coke oven in the present disclosure, heat is released from the desulfurization reaction such that the clean flue gas obtained after desulfurization has an increased temperature, and the raw flue gas is heated by using the temperature difference between the clean flue gas and the raw flue gas, and is delivered into the desulfurization reaction unit for the desulfurization reaction treatment, whereby heat from the discharged clean flue gas is effectively utilized, and energy is saved.

Optionally, heat is supplemented from a hot air furnace to the desulfurization reaction duct of the desulfurization reaction unit to maintain temperature balance in the desulfurization reaction duct. More preferably, it is allowed that the clean flue gas duct has a temperature of 120° C. to 180° C., and the desulfurization reaction duct has a temperature of 100° C. to 160° C.

If the temperature is maintained within the above range, sufficient heat exchange can be further ensured upon the raw flue gas enters the heat exchanger, such that its temperature is increased, and the efficiency of the desulfurization reaction is ensured when the raw flue gas enters the desulfurization reaction duct. If the temperature of the desulfurization reaction duct is kept within the above range, the sufficiency of the desulfurization reaction can be further ensured.

Optionally, the outlet of the clean flue gas duct communicates with an entrance of the hot air furnace, and the clean flue gas which has been heated by the hot air furnace is introduced into the desulfurization reaction unit.

Optionally, when an operation of charging of a coke oven with coal, discharging of coke from the coke oven, or dry quenching of coke is being performed, the blower is running at full or high load, and the raw flue gas is delivered at a pressure of about −2 kPa to −8 kPa into the heat exchanger to exchange heat with the clean flue gas, such that the raw flue gas has an increased temperature and is delivered into the desulfurization reaction unit for desulfurization reaction.

Optionally, when the content of $SO_2$ in the raw flue gas meets the emission standard, the system is supplemented with air. Optionally, when the content of $SO_2$ in the raw flue gas meets the emission standard, the blower is running at low load, which is about 30% of full load, and the system is supplemented with air at a pressure lower than −2 kPa. When the content of $SO_2$ in the raw flue gas meets the emission standard, the raw flue gas is delivered directly to the outside without passing through the heat exchanger, and a certain amount of air is supplemented to match the low-load-running operating condition, and at the same time the air supplementing treatment can balance the heat in the system to prevent entry of flue gas at excessively high temperature into the desulfurization and dedusting sections. When the blower is running at low load, the raw flue gas is expelled into the atmosphere through the raw flue gas system control valve, and an air blending valve provided at the outlet of the raw flue gas duct is opened to supplement air to the system. Moreover, during running at low load, it is preferable to adjust an amount of supplementary heat from the hot air furnace to maintain heat balance in the system for desulfurization and dedusting of flue gas from a coke oven.

The path of the flue gas is controlled according to the characteristics such as periodicity, discontinuity, and low temperature of flue gas emissions from a coke oven in combination with the characteristics of the emission of flue gas from a coke oven. The path of the flue gas is adjusted according to different operations for the coke oven, so that the flue gas from a coke oven can be stably treated according to its periodic variation in the desulfurization and dedusting process.

Optionally, the desulfurization reaction includes one or more of wet desulfurization, dry desulfurization, and semi-dry desulfurization. More preferably, the desulfurization reaction is carried out by desulfurization using sodium alkali, and preferably dry desulfurization using sodium alkali. Further preferably, dry desulfurization is carried out by using sodium bicarbonate. The desulfurization using sodium alkali involves a simple system and less investment, and has a good effect and other advantages.

Optionally, an amount of sodium bicarbonate to be delivered into the desulfurization section is adjusted based on the content of $SO_2$ in the raw flue gas. More preferably, the amount of sodium bicarbonate to be delivered into the desulfurization section is adjusted based on the content of $SO_2$ in the raw flue gas, so that the ratio of sodium to sulfur is 1:(0.8-1.4).

Optionally, sodium bicarbonate has a particle size of 200 meshes to 800 meshes. If the particle size of sodium bicarbonate is within the above range, it can be ensured that sodium bicarbonate is fully decomposed upon being exposed to flue gas at high temperature to obtain sodium carbonate with a finer particle size, so that sodium carbonate fully reacts with $SO_2$ to further improve the desulfurization efficiency.

Compared with the prior art, the embodiments of the present disclosure include, for example, the following advantageous effects:

(1) the system for desulfurization and dedusting of flue gas from a coke oven in the present disclosure controls the path of the flue gas according to the characteristics such as periodicity, discontinuity, and low temperature of flue gas emissions from a coke oven in combination with the characteristics of the emission of flue gas from a coke oven, so that the flue gas from a coke oven can be stably treated according to its periodic variation in the desulfurization and dedusting process; the path of the flue gas is controlled by valves in cooperation with a blower running under a variable operating condition, and a heat exchanger is run intermittently under double operating conditions, run at full load during desulfurization and dedusting, and run at low load when desulfurization and dedusting are not performed;

(2) in the present disclosure, the raw flue gas is heated by using the temperature difference between the clean flue gas and the raw flue gas, and is delivered into the desulfurization section for desulfurization reaction treatment; whereby heat from the discharged clean flue gas is effectively utilized and energy is saved;

(3) the system for desulfurization and dedusting of flue gas from a coke oven in the present disclosure has a simple structure and low energy consumption; the blower, the hot air furnace, the heat exchanger, and the like are used in organic cooperation with each other to ensure continuous and stable running of the system even when the flue gas periodically changes;

(4) the system of the present disclosure may be added directly to the prior flue gas dedusting and purification system according to the arrangement of pipelines, and the system has fewer components, requires low investment, has a convenient operation, and is easily adjustable;

(5) in the system of the present disclosure, the amount of the desulfurizing agent to be fed may be adjusted by a control system based on the change in the concentration of $SO_2$ during operation, such that sodium bicarbonate is saved and cost is reduced; efficient desulfurization during the entire cycle is ensured by using the characteristic of slow decrease in the concentration of $SO_2$ in the flue gas; and moreover, the use of sodium bicarbonate is stopped when the concentration of $SO_2$ meets the emission requirements;

(6) in the present disclosure; high desulfurization efficiency is achieved; sodium bicarbonate acting as a desulfurizing agent is decomposed and reacted at fast speed, and sodium bicarbonate is utilized at a high rate, whereby the problems of fast rising and high peak value of the concentration of $SO_2$ in the flue gas from a coke oven are solved, and ultra-low emission of $SO_2$ is achieved;

(7) in the present disclosure, dry desulfurization is carried out using sodium bicarbonate, and a filtering area is selected in cooperation with an ultra-low filtration air speed, so that the index of flue gas emissions from a coke oven meets the requirements of the national ultra-low emission standard, and atmospheric pollution is reduced.

BRIEF DESCRIPTION OF DRAWINGS

In order to more clearly illustrate technical solutions of embodiments of the present disclosure, drawings required for use in the embodiments will be described briefly below. It should be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE SIGNS

1—heat exchanger; 2—blower; 3—desulfurization reaction unit; 4—dedusting unit; 5—hot air furnace; 6—muffler; 7—chimney; 8—exhaust duct; 9—raw flue gas conveying pipe; 11—raw flue gas duct; 111—first thermometer; 112—second thermometer; 12—clean flue gas duct; 121—third thermometer; 122—fourth thermometer; 31—desulfurization reaction duct; 311—nozzle; 301—desulfurizing agent power transmission unit; 302—desulfurizing agent dosing and feeding unit; 321—desulfurizing agent powder silo; 322—monorail crane; 323—frequency-variable discharge valve; 324—screw weighing and feeding device; 325—mill; 326—material level gauge; 327—silo wall vibrator; 328—air cannon; 331—compressed air tank; 332—Roots blower; 41—bag deduster; 42—conveyor; 43—desulfurized ash silo; 431—discharge port; 411—clean flue gas outlet; 412—ash outlet; 421—pneumatic conveyor; 422—scraper conveyor; 423—bucket elevator; 81—raw flue gas system control valve; 811—first raw flue gas system control valve; 812—second raw flue gas system control valve; 82—air blending valve; 83—first valve; 84—second valve; 85—third valve; 86—fourth valve.

DETAILED DESCRIPTION OF EMBODIMENTS

In order to further clarify the objects, technical solutions, and advantages of the embodiments of the present disclosure, the technical solutions of the present disclosure will be described below clearly and completely with reference to the drawings and specific embodiments, but it will be understood by those skilled in the art that the embodiments to be described below are some, but not all of the embodiments of the present disclosure, and are only intended to illustrate the present disclosure and shall not be considered as limiting the scope of the present disclosure. All the other embodiments obtained by those of ordinary skill in the art in light of the embodiments of the present disclosure without inventive efforts will fall within the scope of the present disclosure as claimed. Examples are carried out in accordance with conventional conditions or conditions recommended by the manufacturer if no specific conditions are specified in the examples. Reagents or instruments used, whose manufacturers are not specified, are all conventional products that are available commercially.

Thus, the following detailed description of the embodiments of the present disclosure, as represented in the drawings, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference signs and letters refer to similar items in the following drawings, and thus once a certain item is defined in one FIGURE, it may not be further defined or explained in the following FIGURES.

In the description of the present disclosure, it should be noted that the terms "mount", "couple", and "connect" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

In addition, the terms such as "first", "second", and "third", if present, are used for distinguishing the description only, and should not be understood as an indication or implication of relative importance.

It should be noted that the features in the embodiments of the present disclosure may be combined with each other without conflict.

Figure 1:
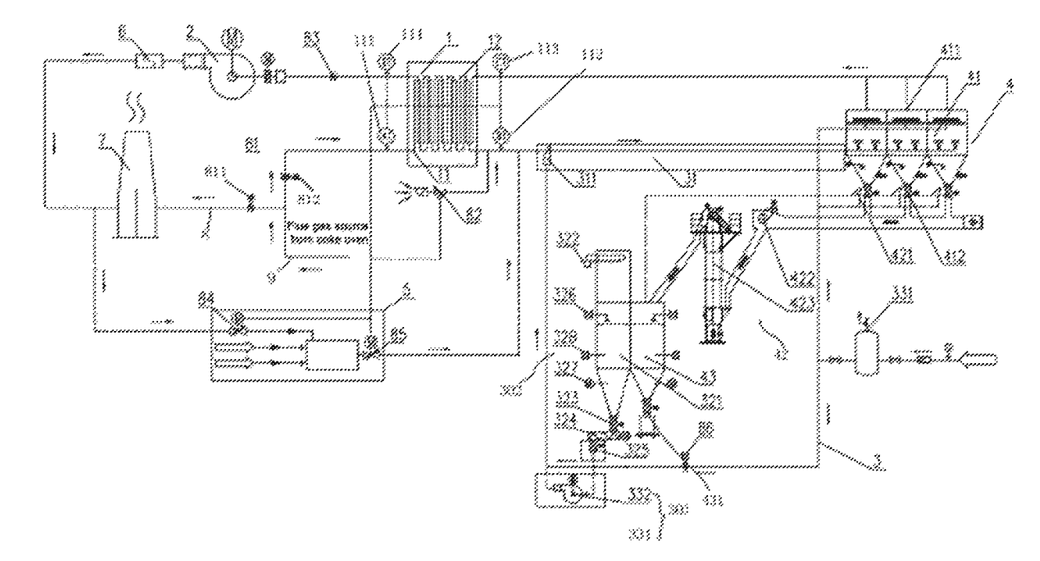
FIG. 1 is a schematic structural diagram of a system for desulfurization and dedusting of flue gas from a coke oven according to an embodiment of the present disclosure.

FIG. 1 illustrates a system for desulfurization and dedusting of flue gas from a coke oven according to an embodiment of the present disclosure. The system for desulfurization and dedusting of flue gas from a coke oven according to this embodiment comprises a heat exchanger 1, a blower 2, a desulfurization reaction unit 3, and a dedusting unit 4. A raw flue gas duct 11 and a clean flue gas duct 12 are disposed inside the heat exchanger 1. The raw flue gas duct 11, the desulfurization reaction unit 3, and the dedusting unit 4 are connected in sequence. A raw flue gas stream in the raw flue gas duct 11 is desulfurized by the desulfurization reaction unit 3, and the desulfurized mixed gas enters the dedusting unit 4 to be dedusted and the purified clean flue gas is obtained. A clean flue gas outlet 411 of the dedusting unit 4 communicates with an inlet of the clean flue gas duct 12, and an outlet of the clean flue gas duct 12 is connected to the blower 2. After the blower 2 is activated, a negative pressure is formed at the inlet of the raw flue gas duct 11, which facilitates the circulation and flow of flue gas through the entire system for desulfurization and dedusting of flue gas from a coke oven.

In the system for desulfurization and dedusting of flue gas from a coke oven mentioned in the embodiment of the present disclosure, raw flue gas is introduced into the desulfurization reaction unit 3 to undergo a desulfurization reaction, heat is released from the desulfurization reaction such that the clean flue gas obtained after desulfurization has an increased temperature, and at the same time the clean flue gas obtained after desulfurization and dedusting is introduced into the clean flue gas duct 12, and heat can be exchanged between the clean flue gas and the raw flue gas flowing in the raw flue gas duct 11 when the clean flue gas flows in the clean flue gas duct 12, that is to say, a temperature difference between the clean flue gas and the raw flue gas allows the clean flue gas at higher temperature to heat the raw flue gas at lower temperature, and the heated raw flue gas is delivered into the desulfurization reaction unit to undergo desulfurization reaction treatment. Energy consumption is reduced and energy is saved by the effective utilization of heat from the discharged clean flue gas.

The raw flue gas duct 11 and the clean flue gas duct 12 are arranged in a staggered manner. Optionally, the raw flue gas duct 11 extends in a serpentine shape along its length direction, the clean flue gas duct 12 extends in a serpentine shape along its length direction, the raw flue gas duct 11 and the clean flue gas duct 12 are attached closely to each other, and there is a large contact area between the raw flue gas duct 11 and the clean flue gas duct 12. While the clean flue gas and the raw flue gas are flowing, heat is exchanged with high efficiency, the raw flue gas is heated with better effect by the clean flue gas, and energy is utilized at a higher rate.

In a preferred implementation of the present disclosure, a raw flue gas system control valve 81 is disposed upstream of the inlet of the raw flue gas duct 11, and the raw flue gas system control valve 81 is configured to control the raw flue gas to enter the raw flue gas duct 11 of the heat exchanger 1 or be expelled into the atmosphere. The path of the flue gas is controlled based on the content of $SO_2$ in the flue gas from a coke oven. Optionally, the flue gas from a coke oven flows into a raw flue gas conveying pipe 9, one end of the raw flue gas conveying pipe 9 is provided with two connection ports communicating with an exhaust duct 8 and the raw flue gas duct 11, respectively, that is to say, the exhaust duct 8 and the raw flue gas duct 11 form two branch pipes allowing the raw flue gas to flow therethrough. Two raw flue gas system control valves 81 are provided and are set as a first raw flue gas system control valve 811 and a second raw flue gas system control valve 812, the first raw flue gas system control valve 811 is disposed on the exhaust duct 8, the second raw flue gas system control valve 812 is disposed on the raw flue gas duct 11, and the second raw flue gas system control valve 812 is located between the inlet of the heat exchanger 1 and a position where the exhaust duct 8 and the raw flue gas duct 11 are connected. For example, while an operation of charging of a coke oven with coal, discharging of coke from the coke oven, or dry quenching of coke is being performed, flue gas generated during this process contains a higher concentration of $SO_2$, and the flue gas contains excessive $SO_2$ and dust, thus the first raw flue gas system control valve 811 is adjusted to be closed and the second raw flue gas system control valve 812 is adjusted to be opened to control the raw flue gas to enter the raw flue gas duct 11 of the heat exchanger 1, and the blower 2 is cooperatively run at full or high load, so that the raw flue gas enters the desulfurization reaction unit 3 to undergo desulfurization and dedusting treatment. When the concentration of $SO_2$ contained in the flue gas meets the emission requirements, for example, when the flue gas contains a continuously decreasing amount of $SO_2$ and dust, does not need to be desulfurized and dedusted, and meets the emission requirements as the operation of charging of the coke oven with coal, discharging of coke from the coke oven, or dry quenching of coke is stopped, the first raw flue gas system control valve 811 is adjusted to be opened and the second raw flue gas system control valve 812 is adjusted to be closed to change the path of the flue gas such that the raw flue gas directly enters the exhaust duct 8, and the blower 2 is cooperatively run at low load, so that the raw flue gas is exhausted. Different operating states of the raw flue gas system control valves 81 are adjusted so that the desulfurization and dedusting system can stably treat the flue gas from a coke oven according to the periodic variation of the flue gas.

The blower 2 is connected to the outlet of the clean flue gas duct 12, and preferably, a first valve 83 is disposed between the blower 2 and the outlet of the clean flue gas duct 12, which may cooperate with the blower 2 to adjust a flow velocity of the raw flue gas in the raw flue gas duct 11 and a flow velocity of the clean flue gas in the clean flue gas duct 12 in the heat exchanger 1.

In a preferred implementation, the system for desulfurization and dedusting of flue gas from a coke oven further comprises a hot air furnace 5, and an outlet of the hot air furnace 5 is connected to an inlet of a desulfurization reaction duct 31 of the desulfurization reaction unit 3. Although some heat can be transferred from the clean flue gas to the raw flue gas in the heat exchanger 1 so that the temperature of the raw flue gas is increased, the temperatures of the heat exchanger 1 and the desulfurization reaction unit 3 might be slowly decreased due to heat loss such as heat dissipation from the system, thus the hot air furnace 5 is used for supplementing heat for the system to maintain temperature balance in the system and improve the desulfurization efficiency. Preferably, the inlet of the hot air furnace 5 communicates with a clean flue gas outlet 411 of the dedusting unit 4, and/or the inlet of the hot air furnace 5 communicates with an air outlet of the blower 2. Hot air may be generated in the hot air furnace 5 by combustion of an appropriate amount of fuel, and the hot air is introduced into the desulfurization reaction duct 31 of the desulfurization reaction unit 3. When the raw flue gas enters the desulfurization reaction unit 3 for desulfurization, heat may be supplemented from the hot air and/or the clean flue gas to the desulfurization reaction unit 3, wherein the fuel may be, but is not limited to, coal gas. For instance, an appropriate amount of coal gas is combusted in the hot air furnace 5 to generate hot air with a certain quantity of heat, which is mixed with the clean flue gas and then delivered into the desulfurization reaction duct 31 of the desulfurization reaction unit 3 to ensure the temperature of the desulfurization reaction unit 3 and enable stable heat exchange between the raw flue gas and the clean flue gas. The effect of saving some fuel can be achieved by simultaneously introducing the clean flue gas and the hot air into the desulfurization reaction duct 31 of the desulfurization reaction unit 3, because the clean flue gas obtained by the desulfurization and dedusting process has a certain temperature. Preferably, the entrance of the hot air furnace 5 is provided with a second valve 84, and the outlet of the hot air furnace is provided with a third valve 85. The amount of supplementary heat is adjusted by adjusting the opening, closing, opening degree, or the like of the second valve 84 and the third valve 85. If the temperature of the heat exchanger 1 and/or the desulfurization reaction unit 3 is greatly decreased, supplementary heat is increased; if the temperature of the heat exchanger 1 and/or the desulfurization reaction unit 3 is slightly decreased, the amount of supplementary heat is relatively reduced; and if the temperature of the heat exchanger 1 and/or the desulfurization reaction unit 3 is maintained in equilibrium, the supplement of heat may be stopped.

In a preferred implementation, the blower 2 is a frequency-variable blower. A frequency at which the blower will be run is regulated according to the characteristics of periodic and discontinuous emission of flue gas from a coke oven. For example, when the flue gas from a coke oven has a high concentration of $SO_2$, it is necessary to accelerate the flow velocity of the raw flue gas and improve the purification efficiency, thus the blower may be run at full load; when the concentration of $SO_2$ in the flue gas from a coke oven is decreased, correspondingly it is not necessary to purify the raw flue gas at a high velocity, thus the blower may be run at relatively low load; when the concentration of $SO_2$ in the flue gas from a coke oven meets the emission standards, the blower may be run directly at low load as long as temperature balance in the system can be ensured.

In a preferred implementation, the outlet of the raw flue gas duct 11 is provided with an air blending valve 82. The air blending valve 82 is configured to supplement a certain amount of air to match the low-load-running operating condition of the blower 2, and to balance heat in the system while supplementing the amount of air to prevent entry of flue gas at excessively high temperature into the desulfurization reaction unit 3. The amount of air to be supplemented is adjusted by regulating the opening or closing or opening degree or the like of the air blending valve 82. For example, when there is a small amount of raw flue gas and the system is continuously running, the air blending valve 82 may be opened to supplement a small amount of air into the system. Alternatively, when the temperature in the desulfurization reaction unit 3 is relatively high, which adversely affects the desulfurization of the raw flue gas, the air blending valve 82 is opened such that a small amount of air at room temperature or even below room temperature is supplemented into the desulfurization reaction unit 3 to serve the function of reducing the temperature of the desulfurization reaction unit 3.

In a preferred implementation, the desulfurization reaction unit 3 comprises a desulfurizing agent power transmission unit 301, a desulfurizing agent dosing and feeding unit 302, and a desulfurization reaction duct 31; the desulfurizing agent dosing and feeding unit 302 is configured to adjust the amount of a desulfurizing agent to be fed; and the desulfurizing agent power transmission unit 301 is configured to feed the desulfurizing agent supplied by the desulfurizing agent dosing unit into the desulfurization reaction duct.

Optionally, the desulfurizing agent dosing unit calculates and adjusts the amount of the desulfurizing agent to be delivered into the desulfurization reaction duct 31 based on the content of $SO_2$ in the raw flue gas, so that the ratio of sodium to sulfur is 1:0.8-1:1.4. For example, the ratio of sodium to sulfur is 1:0.8, or the ratio of sodium to sulfur is 1:1.4, or the ratio of sodium to sulfur is 1:1.1. In each case, the desulfurization efficiency can be improved.

In a preferred implementation, the desulfurizing agent dosing and feeding unit 302 comprises a desulfurizing agent powder silo 321, a monorail crane 322 is disposed on the top of the desulfurizing agent powder silo 321, and a frequency-variable discharge valve 323 and a screw weighing and feeding device 324 are disposed on the bottom of the desulfurizing agent powder silo 321. The frequency-variable discharge valve 323 may adjust the discharging speed based on the actually required amount of the desulfurizing agent, the desulfurizing agent is discharged on the screw weighing and feeding device 324, and is quantitatively conveyed by the screw weighing and feeding device 324, and the desulfurizing agent is finally delivered into the desulfurization reaction duct 31. Optionally, the screw weighing and feeding device 324 is configured to weigh the amount of the desulfurizing agent so as to meet the demand for change in the amount of the material to be used. The monorail crane 322 is configured to add the material into the desulfurizing agent powder silo 321. Preferably, a mill 325 is disposed under the screw weighing and feeding device 324. A single-stage mill 325 or a multi-stage mill 325 is disposed at the outlet of the screw weighing and feeding device 324 in order to allow the desulfurizing agent to be delivered into the desulfurization reaction duct 31 to have a required particle size, wherein the single-stage mill 325 may include one independent mill 325, the multi-stage mill 325 may include multiple mills 325 of different models, and the multiple mills 325 are connected in sequence and may mill the material to different degrees to obtain the desulfurizing agent with the required particle size. During actual running, the multiple mills 325 are sequentially arranged between the outlet of the screw weighing and feeding device 324 and the inlet of the desulfurization reaction duct 31, and the particle size of the material obtained after being milled by the mill 325 close to the outlet of the screw weighing and feeding device 324 is larger than the particle size of the material obtained after being milled by the mill 325 remote from the outlet of the screw weighing and feeding device 324. The desulfurizing agent is milled in stages, so that a good milling effect is achieved, and the mill 325 is not easily damaged. For example, when sodium bicarbonate is used as the desulfurizing agent, sodium bicarbonate preferably has a particle size of 200 meshes to 800 meshes. If the particle size of sodium bicarbonate is within the above range, it can be ensured that sodium bicarbonate is fully decomposed upon being exposed to flue gas at high temperature to obtain sodium carbonate with a finer particle size, so that sodium carbonate fully reacts with $SO_2$ to further improve the desulfurization efficiency. Depending on the actual particle size of the desulfurizing agent in the silo, the desulfurizing agent is treated with the mill 325 to reach a particle size as required in the desulfurization reaction.

Preferably, a material level gauge 326, a silo wall vibrator 327, and an air cannon 328 are disposed inside the desulfurizing agent powder silo 321. The material level gauge 326 is configured to measure the position of the desulfurizing agent in the desulfurizing agent powder silo 321 so as to provide a real-time understanding of the amount of the desulfurizing agent remaining in the desulfurizing agent powder silo 321; the silo wall vibrator 327 is configured to prevent and eliminate blockage of the desulfurizing agent powder silo 321 caused by internal friction, deliquescence, electrification, or component segregation of the material or other reasons; the air cannon 328 is operated by using the aerodynamic principle and using air as a working medium, may instantly convert air pressure energy into air jet kinetic energy, which may generate strong airflow to avoid the blockage of the desulfurizing agent powder silo 321 by the desulfurizing agent.

In a preferred implementation, the desulfurizing agent power transmission unit 301 comprises a compressed air tank 331 and/or a Roots blower 332. The compressed air tank 331 can deliver the desulfurizing agent into the desulfurization reaction duct 31 by means of positive pressure of the compressed air. The Roots blower 332 supplies power for uniform mixing of the desulfurizing agent and the flue gas.

In a preferred implementation, a nozzle 311 is disposed in the desulfurization reaction duct 31. Preferably, the nozzle 311 is a two-fluid atomizing nozzle. One or more nozzles 311 may be provided according to the actual requirement for mixing uniformity. The nozzle 311 may be disposed at the inlet of the desulfurization reaction duct 31, or may be adjusted as actually needed, and it is preferable to ensure that the desulfurizing agent and the raw flue gas are mixed and resident in the desulfurization section for 1 s to 4 s. The flow velocity of the gas in the desulfurization reaction duct 31 may be adjusted as actually needed, and the length of the desulfurization reaction duct 31 is cooperatively adjusted such that the desulfurizing agent and the raw flue gas are resident in the desulfurization section for 1 s to 4 s, so that the desulfurization reaction is completely carried out. For example, when the gas has a flow velocity of 3 m/s, the desulfurization reaction duct 31 has a length of 3 m to 12 m in order to meet the requirement that the desulfurizing agent and the raw flue gas are resident in the desulfurization section for 1 s to 4 s. More preferably, a fourth valve 86 may be disposed between the desulfurizing agent power transmission unit 301 and the nozzle 311, the fourth valve 86 may be, but is not limited to, a solenoid valve, and the fourth valve 86 is configured to deactivate or activate an operation of delivering the desulfurizing agent into the desulfurization reaction duct 31.

In a preferred implementation of the present disclosure, the dedusting unit 4 comprises a bag deduster (or bag filter) 41, a conveyor 42, and a desulfurized ash silo 43. An ash outlet 412 of the bag deduster 41 is connected to an inlet end of the conveyor 42, and an outlet end of the conveyor 42 is connected to the desulfurized ash silo 43; and a clean flue gas outlet 411 of the bag deduster 41 is connected to the inlet of the clean flue gas duct 12 of the heat exchanger 1.

After being dedusted by the bag deduster 41 of the dedusting unit 4, the filtered desulfurized ash is discharged from the ash outlet 412 to the conveyor 42, and the conveyor 42 conveys the desulfurized ash to the desulfurized ash silo 43 for collection and storage of the desulfurized ash. Optionally, a discharge port 431 is disposed at the bottom of the desulfurized ash silo 43, a transfer device may be placed under the discharge port 431, and the transfer device can receive the desulfurized ash discharged from the discharge port 431, and then the desulfurized ash is gathered and transported to a treatment plant for treatment. Optionally, a fifth valve is disposed at the discharge port 431, and the fifth valve controls the opening and closing of the discharge port 431.

The type of the bag deduster 41 is not limited. For example, a pulsed bag deduster may be used, which has the advantages of strong dust removability, high dedusting efficiency, low emission concentration, low air leakage rate, low energy consumption, etc.

The conveyor 42 may be adjusted and designed according to the actual positions where the bag deduster 41 and the desulfurized ash silo 43 are disposed. For example, when there is a large height difference between the desulfurized ash silo 43 and the ash outlet 412 of the bag deduster 41, there is sufficient mounting space between the desulfurized ash silo 43 and the ash outlet 412 of the bag deduster 41, and the conveyor 42 may comprise a pneumatic conveyor 421, a scraper conveyor 422, and a bucket elevator 423. The pneumatic conveyor 421, the scraper conveyor 422, and the bucket elevator 423 are connected in sequence. The desulfurized ash is discharged from the ash outlet 412 to the pneumatic conveyor 421 and is conveyed to the scraper conveyor 422 by the pneumatic conveyor 421, and then the scraper conveyor 422 transports the desulfurized ash to the bucket elevator 423, and the desulfurized ash is lifted and delivered to the desulfurized ash silo 43 by the bucket elevator 423, whereby the collection and storage of the desulfurized ash are completed.

In a preferred implementation of the present disclosure, the system for desulfurization and dedusting of flue gas from a coke oven further comprises a muffler 6 and a chimney 7, and the blower 2, the muffler 6, and the chimney 7 are connected in sequence. The air outlet end of the blower 2 is connected with the muffler 6, thus the blower 2 has low noise and causes less noise pollution during running.

In a preferred implementation of the present disclosure, the system for desulfurization and dedusting of flue gas from a coke oven further comprises a controller (not shown in the FIGURE). The controller is electrically connected to each of the valves to control the opening, closing and/or opening degree of each valve. Specifically, the raw flue gas system control valve 81, the air blending valve 82, the first valve 83, the second valve 84, the third valve 85, the fourth valve 86, and the fifth valve are all connected to the controller. During the actual operation, for example, the raw flue gas system control valve 81 is electrically connected to the controller, and the raw flue gas system control valve 81 is controlled to be opened or closed according to the operation condition for the coke oven so as to adjust the path of the flue gas.

In a preferred implementation of the present disclosure, the screw weighing and feeding device 324 is connected to the controller, and the amount of the desulfurizing agent to be fed is adjusted in real time according to the status of the flue gas, so as to ensure efficient desulfurization throughout the entire flue gas purification cycle and save the desulfurizing agent.

In a preferred implementation of the present disclosure, each of the inlets and outlets of the raw flue gas duct 11 and the clean flue gas duct 12 is provided with a thermometer. Optionally, a first thermometer 111 is disposed at the inlet of the raw flue gas duct 11, a second thermometer 112 is disposed at the outlet of the raw flue gas duct 11, a third thermometer 121 is disposed at the inlet of the clean flue gas duct 12, and a fourth thermometer 122 is disposed at the outlet of the clean flue gas duct 12. The first thermometer 111, the second thermometer 112, the third thermometer 121, and the fourth thermometer 122 are all electrically connected to the controller. The controller acquires the temperatures of the inlet and outlet of the heat exchanger 1 from the first thermometer 111 and the second thermometer 112, respectively, and controls, in a coordinated manner, the opening, closing, and/or opening degree of the second valve 84 and the third valve 85 of the hot air furnace 5 as well as the opening, closing, and/or opening degree of the air blending valve 82 depending on the temperatures of the inlet and outlet of the heat exchanger 1 so as to ensure stable running of the system and maintain temperature balance.

The operating procedure and principle of the system for desulfurization and dedusting of flue gas from a coke oven mentioned in the embodiment of the present disclosure will be described briefly below.

A process for desulfurization and dedusting of flue gas from a coke oven according to an embodiment of the present disclosure comprises the following steps:

(1) while an operation of charging of a coke oven with coal, discharging of coke from the coke oven, or dry quenching of coke is being performed, the collected raw flue gas contains excessive $SO_2$ and dust. If the raw flue gas containing a relatively high amount of $SO_2$ does not meet the emission requirements, the blower 2 is run under a full load condition such that a negative pressure of about −2 kPa to −8 kPa may be generated at the inlet of the raw flue gas duct 11 in the system, the first valve 83 is opened, and the first raw flue gas system control valve 811 is controlled to be closed and the second raw flue gas system control valve 812 is controlled to be opened so that the flue gas resulting from a coke oven is delivered into the raw flue gas duct 11 of the heat exchanger 1; the clean flue gas obtained after being desulfurized and deducted by this system is delivered from the clean flue gas outlet 411 of the bag deduster 41 into the clean flue gas duct 12 of the heat exchanger 1; in the heat exchanger 1, the raw flue gas has a lower temperature, the clean flue gas has a higher temperature, and the temperature of the clean flue gas is higher than that of the raw flue gas, therefore the temperature of the raw flue gas is increased by using the temperature difference between the raw flue gas and the clean flue gas, and the raw flue gas at an increased temperature is delivered through the outlet of the raw flue gas duct 11 of the heat exchanger 1 into the desulfurization reaction duct 31 for desulfurization treatment, wherein an increase in the temperature of the raw flue gas results in a better desulfurization effect, and the raw flue gas is heated by properly using heat generated during the desulfurization of the raw flue gas, whereby energy is utilized at high rate, and energy is saved;

(2) sodium bicarbonate is placed in the desulfurizing agent powder silo 321, and the controller opens the frequency-variable discharge valve 323 and the screw weighing and feeding device 324 depending on the magnitude of the concentration of $SO_2$ in the raw flue gas and adjusts the amount of sodium bicarbonate to be fed such that the ratio of sodium to sulfur is 1:(0.8-1.4); at the same time, if the sodium bicarbonate material does not have a required particle size, the controller controls activation of the mill 325 to pulverize sodium bicarbonate to 200 meshes to 800 meshes, and the grinded desulfurizing agent is delivered into the duct between the nozzle 311 and the compressed air tank 331; the controller opens the fourth valve 86 such that the compressed air delivers sodium bicarbonate into the nozzle 311 via positive pressure, and sodium bicarbonate is sprayed from the nozzle 311 into the desulfurization reaction duct 31; in order to further improve the uniformity of mixing of sodium bicarbonate with the flue gas, the Roots blower 332 may be activated as power for uniform mixing, and it is ensured that sodium bicarbonate and the raw flue gas are mixed and resident in the desulfurization section for 1 s to 4 s, wherein the desulfurizing agent of the present disclosure may be defined as actually needed, and is not limited to sodium bicarbonate; in this embodiment, the use of sodium bicarbonate as the desulfurizing agent has the advantages of fast decomposition and reaction speed and high utilization rate, and can also solve the problem that the concentration of $SO_2$ in the flue gas from a coke oven rises at fast speed and has a high peak value;

(3) sodium bicarbonate is delivered into the desulfurization reaction duct 31, and is exposed to the raw flue gas discharged from the raw flue gas duct 11 of the heat exchanger 1 and then decomposed to produce sodium carbonate with a finer particle size, sodium carbonate fully reacts with $SO_2$ in the raw flue gas and then a product such as $Na_2SO_3$ is produced, the product and the unreacted desulfurization reactant enter the pulsed bag deduster 4 along with the flue gas under the action of the blower 2, the unreacted sodium carbonate may continue to react with $SO_2$ in the flue gas in the bag deduster 4 such that the duration of the desulfurization reaction is prolonged, the product resulting from the full reaction enters a filtering layer of the deduster together with particulate matters such as dust, and the filtered desulfurized ash is delivered through the ash outlet 412 into the desulfurized ash silo 43 by the pneumatic conveyor 421, the scraper conveyor 422, and/or the bucket elevator 423; the clean flue gas obtained by the desulfurization and deducting treatment enters the clean flue gas duct 12 of the heat exchanger 1 through the clean flue gas outlet 411, the clean flue gas can exchange heat with the raw flue gas, and the procedure of step (1) is repeated cyclically;

(4) the clean flue gas which has exchanged heat with the raw flue gas in the heat exchanger 1 becomes a low-temperature clean flue gas, which is delivered into the chimney 7 by the blower 2 and finally expelled into the atmosphere;

alternatively, although the heat exchanger 1 can transfer most of heat carried by the clean flue gas from the clean flue gas to the raw flue gas, the temperatures of the heat exchanger 1 and the desulfurization reaction duct 3 will slowly decrease due to the factors such as heat dissipation from the system and heat loss at the outlet; when the temperature of the heat exchanger 1 decreases to 40° C. to 80° C., the hot air furnace 5 is activated, and a small amount of fuel is combusted by the hot air furnace 5 such that heat is generated and delivered into the desulfurization reaction duct 31 of the desulfurization reaction unit 3 for heat supplement; at this time, the clean flue gas discharged from the blower 2 can be delivered into the hot air furnace 5, and the effect of saving some fuel can be achieved and energy is further saved as this part of clean flue gas has a certain temperature;

(5) when the operation of charging of the coke oven with coal, discharging of coke from the coke oven, or dry quenching of coke is stopped, the content of $SO_2$ and dust in the raw flue gas is continuously decreased; when the components in the raw flue gas meet the emission requirements so that desulfurization and dedusting are not required, the frequency-variable discharge valve 323 is first closed to stop the supply of the material; after a period of delay time, and after all the desulfurizing agent in the pipeline is sprayed by the compressed air into the desulfurization reaction duct 31, the fourth valve 86 is closed to stop the spraying of the desulfurizing agent; at this time, the blower 2 is adjusted to run at an frequency changed from full load to low load, and the clean flue gas passing through the heat exchanger 1 enters the chimney 7 and is exhausted;

(6) the raw flue gas system control valve 81 is adjusted, and specifically, the second raw flue gas system control valve 812 is closed and the first raw flue gas system control valve 811 is opened, so that the flow of the flue gas resulting from a coke oven to the raw flue gas duct is blocked, and the flue gas resulting from a coke oven flows smoothly to the exhaust duct 8 such that the raw flue gas meeting the emission condition flows directly to the chimney 7 to be discharged through the first raw flue gas system control valve 811;

(7) the air blending valve 82 is opened, and a certain amount of air is supplemented from the air blending valve 82 to the system to match the low-load-running operating condition of the blower 2, and the amount of air is supplemented while heat in the system is balanced to prevent entry of flue gas at excessively high temperature into the desulfurization reaction duct 31; the hot air furnace 5 is deactivated or the amount of supplementary heat from the hot air furnace 5 is reduced, so that the gas introduced from the hot air furnace 5 into the desulfurization reaction duct 31 carries reduced heat, which cooperates with the air blending valve 82 to maintain the heat in the system into an equilibrium state.

When the operation of charging of the coke oven with coal, discharging of coke from the coke oven, or dry quenching of coke is stopped, the content of $SO_2$ and dust in the raw flue gas is continuously decreased. When the raw flue gas meets the emission requirements and the blower 2 is still running in the low load state, the hot air furnace 5 cooperates with the air blending valve 82 such that the temperature in the clean flue gas duct 12 is 40° C. to 200° C. and the temperature of the desulfurization section is 80° C. to 200° C., and optionally, the temperature in the clean flue gas duct 12 is 120° C. to 180° C. and the temperature in the desulfurization reaction duct 31 is 100° C. to 160° C., in order to ensure a relatively stable temperature balance maintained in the heat exchanger 1 and the desulfurization reaction duct 31. In this way, stable running of the system can be ensured during the period of circulation of the flue gas from a coke oven. In the next operation of coal charging, coke discharging, or dry quenching of coke, heat can be exchanged immediately after the raw flue gas enters the heat exchanger 1, so that the raw flue gas has an increased temperature and can be desulfurized quickly upon entering the desulfurization reaction duct 31, thereby improving the desulfurization efficiency.

The steps described above are performed cyclically and repetitively. The path of flue gas or the like is controlled in connection with the characteristics of low temperature and periodic running of flue gas from a coke oven, so that the index of flue gas emissions from a coke oven meets the requirements of the national ultra-low emission standard, thereby reducing atmospheric pollution. The desulfurization and dedusting process according to this embodiment involves a simple process and a convenient operation, has a high desulfurization and dedusting efficiency, and ameliorates the problems of unstable treatment and high consumption of energy by desulfurization due to low temperature, intermittent running; and periodic change of flue gas from a coke oven.

In the actual operation process, during running at full load, heat is exchanged normally between the raw flue gas in the raw flue gas duct 11 and the clean flue gas in the clean flue gas duct 12 in the heat exchanger 1, and the amount of gas in the raw flue gas duct 11 is substantially the same as the amount of gas in the clean flue gas duct 12 (the difference is a small amount of high-temperature flue gas from the hot air furnace 5 plus the amount of air leaking from the system); during running at low load, there is no flow through the raw flue gas inlet and outlet of the heat exchanger 1, the flow rate through the clean flue gas inlet and outlet is about 30% of the flow rate during running at full load, the temperature of the clean flue gas inlet is the same as that during running at full load, and the temperature of the clean flue gas outlet rises slowly compared to that during running at full load. When the system is running at full load in the next cycle, the raw flue gas entering the heat exchanger 1 can exchange heat with the clean flue gas in time to increase the temperature, and then undergo the desulfurization reaction. Heat exchange is stably performed in connection with the characteristic of intermittent running of the flue gas from a coke oven, which results in high desulfurization and dedusting efficiency and low energy consumption. The heat exchanger 1 preferably has a leakage rate of <5% to meet the requirement for ultra-low emission of $SO_2$ and dust. The respective parts of the system are controlled in a coordinated manner to fulfil the balanced adjustment of the system.

The above description is merely illustrative of preferred embodiments of the present disclosure and is not intended to limit the present disclosure. It will be understood by those skilled in the art that various modifications and variations can be made to the present disclosure. Any modifications, equivalent alternatives, improvements and so on made within the spirit and principle of the present disclosure are to be included in the scope of protection of the present disclosure.

INDUSTRIAL APPLICABILITY

In summary, the present disclosure provides a system and method for desulfurization and dedusting of flue gas from a coke oven, which have high desulfurization efficiency and low energy consumption.

What is claimed is:

1. A system for desulfurization and dedusting of flue gas from a coke oven, comprising a heat exchanger, a desulfurization reaction unit, a dedusting unit, and a blower,
   wherein the heat exchanger comprises a raw flue gas duct and a clean flue gas duct; and
   the raw flue gas duct, the desulfurization reaction unit, and the dedusting unit are connected in sequence, a clean flue gas outlet of the dedusting unit communicates with an inlet of the clean flue gas duct, and an outlet of the clean flue gas duct is connected to the blower.

2. The system for desulfurization and dedusting of flue gas from a coke oven according to claim 1, wherein the system for desulfurization and dedusting of flue gas from a coke oven further comprises a hot air furnace, and an outlet of the hot air furnace is connected to an inlet of a desulfurization reaction duct of the desulfurization reaction unit; and
   an inlet of the hot air furnace communicates with the outlet of the clean flue gas duct via the blower, or the inlet of the hot air furnace communicates with the clean flue gas outlet of the dedusting unit via the blower.

3. The system for desulfurization and dedusting of flue gas from a coke oven according to claim 1, wherein the blower is a frequency-variable blower.

4. The system for desulfurization and dedusting of flue gas from a coke oven according to claim 1, wherein a raw flue gas system control valve is disposed upstream of an inlet of the raw flue gas duct, and the raw flue gas system control valve is configured to control raw flue gas to be expelled into the atmosphere or enter the raw flue gas duct of the heat exchanger; and
   an outlet of the raw flue gas duct is provided with an air blending valve.

5. The system for desulfurization and dedusting of flue gas from a coke oven according to claim 1, wherein the desulfurization reaction unit comprises a desulfurizing agent power transmission unit, a desulfurizing agent dosing and feeding unit, and a desulfurization reaction duct,
   wherein the desulfurizing agent dosing and feeding unit is configured to adjust an amount of a desulfurizing agent to be fed; and
   the desulfurizing agent power transmission unit is configured to feed into the desulfurization reaction duct the desulfurizing agent supplied by the desulfurizing agent dosing and feeding unit.

6. The system for desulfurization and dedusting of flue gas from a coke oven according to claim 5, wherein the desulfurizing agent dosing and feeding unit comprises a desulfurizing agent powder sib, wherein a monorail crane is disposed on a top of the desulfurizing agent powder sib, and a frequency-variable discharge valve and a screw weighing and feeding device are disposed on a bottom of the desulfurizing agent powder sib;
   at least one mill is disposed under the screw weighing and feeding device, and a discharge port of the at least one mill communicates with the desulfurization reaction duct; and
   a material level gauge, a silo wall vibrator, and an air cannon are disposed inside the desulfurizing agent powder silo.

7. The system for desulfurization and dedusting of flue gas from a coke oven according to claim 6, wherein multiple mills are provided, the multiple mills are sequentially arranged between an outlet of the screw weighing and feeding device and an inlet of the desulfurization reaction duct, and a particle size of a material obtained after being milled by a mill being close to the outlet of the screw weighing and feeding device is larger than a particle size of the material obtained after being milled by a mill being remote from the outlet of the screw weighing and feeding device.

8. The system for desulfurization and dedusting of flue gas from a coke oven according to claim 5, wherein the desulfurizing agent power transmission unit comprises a compressed air tank and/or a Roots blower.

9. The system for desulfurization and dedusting of flue gas from a coke oven according to claim 5, wherein a nozzle is disposed in the desulfurization reaction duct, and the nozzle is connected to an outlet end of the desulfurizing agent power transmission unit; and the nozzle is a two-fluid atomizing nozzle.

10. The system for desulfurization and dedusting of flue gas from a coke oven according to claim 1, wherein the dedusting unit comprises a bag deduster, a conveyor, and a desulfurized ash silo;

an ash outlet of the bag deduster is connected to an inlet end of the conveyor, and an outlet end of the conveyor is connected to an entrance end of the desulfurized ash silo; and a clean flue gas outlet of the bag deduster is connected to the inlet of the clean flue gas duct.

11. The system for desulfurization and dedusting of flue gas from a coke oven according to claim 10, wherein the conveyor comprises a pneumatic conveyor, a scraper conveyor, and a bucket elevator, wherein the pneumatic conveyor, the scraper conveyor, and the bucket elevator are connected in sequence, the pneumatic conveyor communicates with the ash outlet, and the bucket elevator communicates with the entrance end of the desulfurized ash silo.

12. The system for desulfurization and dedusting of flue gas from a coke oven according to claim 1, wherein the system for desulfurization and dedusting of flue gas from a coke oven further comprises a muffler and a chimney, wherein the blower, the muffler, and the chimney are connected in sequence.

13. The system for desulfurization and dedusting of flue gas from a coke oven according to claim 12, further comprising a raw flue gas conveying pipe and an exhaust duct, wherein both the exhaust duct and the raw flue gas duct communicate with the raw flue gas conveying pipe, the exhaust duct is provided with a first raw flue gas system control valve, and the raw flue gas duct is provided with a second raw flue gas system control valve.

14. The system for desulfurization and dedusting of flue gas from a coke oven according to claim 1, wherein a first thermometer is disposed at the inlet of the raw flue gas duct, and a second thermometer is disposed at the outlet of the raw flue gas duct; and a third thermometer is disposed at the inlet of the clean flue gas duct, and a fourth thermometer is disposed at the outlet of the clean flue gas duct.

15. A desulfurization and dedusting method using the system for desulfurization and dedusting of flue gas from a coke oven according to claim 1, comprising steps of:

delivering, by the blower, the raw flue gas into the raw flue gas duct to undergo heat exchange, and then allowing the raw flue gas to sequentially enter the desulfurization reaction unit and the dedusting unit to undergo desulfurization reaction and dedusting treatment to obtain clean flue gas, delivering the clean flue gas from the clean flue gas outlet of the dedusting unit into the clean flue gas duct to undergo heat exchange, and then emitting the clean flue gas.

16. A desulfurization and dedusting method using the system for desulfurization and dedusting of flue gas from a coke oven according to claim 1, comprising steps of:

introducing the raw flue gas into the raw flue gas duct by the blower, allowing the raw flue gas to flow from the raw flue gas duct into the desulfurization reaction unit to undergo desulfurization, allowing desulfurized raw flue gas to enter the dedusting unit to undergo dedusting treatment to obtain clean flue gas, allowing the clean flue gas to flow from the clean flue gas outlet of the dedusting unit into the clean flue gas duct, and allowing the clean flue gas located in the clean flue gas duct and the raw flue gas located in the raw flue gas duct to undergo heat exchange, so as to heat the raw flue gas.

17. The desulfurization and dedusting method using the system for desulfurization and dedusting of flue gas from a coke oven according to claim 16, wherein heat is supplemented from the hot air furnace to the desulfurization reaction unit to maintain a temperature balance in the desulfurization reaction unit.

18. The desulfurization and dedusting method using the system for desulfurization and dedusting of flue gas from a coke oven according to claim 17, wherein the outlet of the clean flue gas duct communicates with an entrance of the hot air furnace, and the clean flue gas which has been heated by the hot air furnace is introduced into the desulfurization reaction unit.

19. The desulfurization and dedusting method using the system for desulfurization and dedusting of flue gas from a coke oven according to claim 17, wherein when the blower is running at low load, the raw flue gas system control valve is adjusted such that the raw flue gas is expelled into the atmosphere, and the air blending valve disposed at the outlet of the raw flue gas duct is opened such that air is supplemented to the system for desulfurization and dedusting of flue gas from a coke oven; and an amount of supplementary heat from the hot air furnace is adjusted to maintain a heat balance in the system for desulfurization and dedusting of flue gas from a coke oven.

20. The desulfurization and dedusting method using the system for desulfurization and dedusting of flue gas from a coke oven according to claim 15, wherein dry desulfurization is carried out by the desulfurization reaction unit using sodium alkali.

* * * * *